US010990122B2

(12) United States Patent
Goodrich et al.

(10) Patent No.: US 10,990,122 B2
(45) Date of Patent: *Apr. 27, 2021

(54) SECURE REAL-TIME CLOCK UPDATE IN AN ACCESS CONTROL SYSTEM

(71) Applicant: Schlage Lock Company LLC, Carmel, IN (US)

(72) Inventors: John Goodrich, Carmel, IN (US); Devin A. Love, Westfield, IN (US); Robert Martens, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/781,536

(22) Filed: Feb. 4, 2020

(65) Prior Publication Data

US 2020/0348719 A1 Nov. 5, 2020

Related U.S. Application Data

(63) Continuation of application No. 15/656,678, filed on Jul. 21, 2017, now Pat. No. 10,551,870.

(51) Int. Cl.
*G06F 1/14* (2006.01)
*H04L 9/32* (2006.01)
(Continued)

(52) U.S. Cl.
CPC .............. *G06F 1/14* (2013.01); *H04L 9/0891* (2013.01); *H04L 9/3213* (2013.01);
(Continued)

(58) Field of Classification Search
CPC ... G06F 1/14; G07C 9/00309; G07C 9/00571; H04L 2209/80; H04L 2463/121;
(Continued)

(56) References Cited

U.S. PATENT DOCUMENTS 8,861,505 B1 * 10/2014 de la Broise ..... H04W 56/0015
370/350
9,397,990 B1 * 7/2016 Taly ........................ H04L 63/08
(Continued)

OTHER PUBLICATIONS

Australian Examination Report; Australia Patent Office; Australian Patent Application No. 2018304716; dated Sep. 14, 2020; 3 pages.
Australian Examination Report; Australia Patent Office; Australian Patent Application No. 2018304716; dated Aug. 13, 2020; 3 pages.
International Search Report; International Searching Authority; International Patent Application No. PCT/US2018/043280; dated Oct. 29, 2018; 2 pages.
(Continued)

*Primary Examiner* — Terrell S Johnson
(74) *Attorney, Agent, or Firm* — Taft Stettinius & Hollister LLP

(57) ABSTRACT

A method according to one embodiment includes communicating a wireless advertisement that identifies a clock status of a real-time clock of the access control device, wherein the clock status includes a clock status value indicating that the real-time clock has not been set, establishing a wireless communication connection with a computing device in response to the wireless advertisement, transmitting a session random value to the computing device, receiving a clock update token from the computing device, wherein the clock update token is indicative of an authority of the computing device to update the real-time clock of the access control device, authenticating the clock update token based on at least the session random value, and updating the real-time clock based on a received update time in response to successful authentication of the clock update token.

20 Claims, 8 Drawing Sheets

(51) Int. Cl.
  *H04L 29/06* (2006.01)
  *H04L 9/08* (2006.01)
  *H04W 12/06* (2021.01)
  *H04W 12/08* (2021.01)
  *G07C 9/00* (2020.01)

(52) U.S. Cl.
  CPC .......... *H04L 9/3236* (2013.01); *H04L 9/3297* (2013.01); *H04L 63/0807* (2013.01); *H04L 63/102* (2013.01); *H04W 12/06* (2013.01); *H04W 12/08* (2013.01); *G07C 9/00309* (2013.01); *G07C 9/00571* (2013.01); *H04L 63/101* (2013.01); *H04L 2209/80* (2013.01); *H04L 2463/121* (2013.01)

(58) Field of Classification Search
  CPC . H04L 63/0807; H04L 63/101; H04L 63/102; H04L 9/0891; H04L 9/3213; H04L 9/3236; H04L 9/3297; H04W 12/06; H04W 12/08
  See application file for complete search history.

(56) References Cited

U.S. PATENT DOCUMENTS

| | | | |
|---|---|---|---|
| 10,551,870 B2* | 2/2020 | Goodrich | G06F 1/14 |
| 2013/0043973 A1 | 2/2013 | Greisen et al. | |
| 2014/0051425 A1 | 2/2014 | Ahearn et al. | |
| 2014/0068247 A1* | 3/2014 | Davis | H04L 9/3228 713/155 |
| 2015/0207795 A1* | 7/2015 | Wentz | H04L 9/12 726/4 |
| 2017/0223005 A1 | 8/2017 | Birgisson et al. | |

OTHER PUBLICATIONS

Written Opinion; International Searching Authority; International Patent Application No. PCT/US2018/043280; dated Oct. 9, 2018; 6 pages.

New Zealand Examination Report; New Zealand Intellectual Property Office; New Zealand Patent Application No. 761969; dated Nov. 27, 2020; 2 pages.

* cited by examiner

Advertising Data:
0x02010614FF3B0101000802010002B51D237FD5C5030000001107D0332B784E9A6498AA46CB14EC453F880C09534543453734644354335

702

Session Random Value:
0xAFAEC33D4EFC3760AE903D8D

Value to Hash:
03 AF AE C3 3D 4E FC 37 60 AE 90 3D 8D

Hashed Value:
0F 6E 32 8E 88 6F 8D 58 0E 6F 22 0F 76 02 C8 B3 BA 83 0F A4 5E C3 A6 83 7C 09 13 68 48 8B E2 61

FIG. 7

Base Cryptographic Bearer Token:
58 20 B3 43 19 20 01 46 08 1A 1F AA 49 6F 42 0C 00 50 C1 76 EC 7B 7E D4 79 6D 6A 7A 1B D0 45 76 C0 CD 802a  806  808  810  812a
804a Caveated Cryptographic Bearer Token Including Clock Update Caveat:
58 22 B4 43 19 20 01 46 08 1A 1F AA 49 6F 42 0C 00 41 0B 50 9E 24 99 8B DF 34 96 6C 3D 33 CF 62 E0 3F F0 8C 802b  806  808  810  814  812b
804b Clock Update Token:
58 5A 8C 43 19 20 01 46 08 1A 1F AA 49 6F 42 0C 00 41 0B 46 00 44 0F 6E 32 8E 46 00 44 88 6F 8D 58

SECURE REAL-TIME CLOCK UPDATE IN AN ACCESS CONTROL SYSTEM

CROSS-REFERENCE TO RELATED APPLICATIONS

The present application is a continuation of U.S. patent application Ser. No. 15/656,678 filed Jul. 21, 2017 and issued as U.S. Pat. No. 10,551,870, the contents of which are incorporated herein by reference in their entirety.

BACKGROUND

Access control systems typically involve the use of credentials to manage the operation of an access control device (e.g., a lock device). Such credentials may be assigned to a particular user or device and are often physical in nature, forming at least a portion of, for example, a smartcard, proximity card, key fob, token device, or mobile device. Additionally, an access control database that identifies which credentials (e.g., which user devices) are permitted control over the access control device (e.g., lock/unlock functions) is typically stored on the access control device or a server in communication with the access control device. As such, an update to the access control database to change the credentials associated with the access control device, if even possible, often involves an update (or even a factory reset) of the access control device itself.

Access control systems that rely on time-based credentials often assume that access control devices (e.g., lock devices) and/or other secure devices have an accurate time basis. However, battery replacement, certain hardware malfunctions, and various other conditions may cause the real-time clock of those devices to be reset. As such, various errors may occur when a time-based credential is presented to an access control device with a real-time clock that has been reset.

SUMMARY

According to one aspect, a method may include communicating, by an access control device, a wireless advertisement that identifies a clock status of a real-time clock of the access control device, wherein the clock status includes a clock status value indicating that the real-time clock has not been set, establishing, by the access control device, a wireless communication connection with a computing device in response to the wireless advertisement, transmitting, by the access control device, a session random value to the computing device, receiving, by the access control device, a clock update token from the computing device, wherein the clock update token is indicative of an authority of the computing device to update the real-time clock of the access control device, authenticating, by the access control device, the clock update token based on at least the session random value, and updating, by the access control device, the real-time clock based on a received update time in response to successful authentication of the clock update token.

In some embodiments, the clock update token may include a caveated cryptographic bearer token that includes a clock update caveat that limits access control permissions of the computing device over the access control device to updating the real-time clock of the access control device. In some embodiments, the clock update token may further include a timestamp caveat that identifies an appropriate time basis for the real-time clock of the access control device. In some embodiments, the clock status value may be a non-zero random value, and the clock update token may further include one or more caveats corresponding with a cryptographic hash generated based on the non-zero random value and the session random value. In some embodiments, authenticating the clock update token may include generating a reference cryptographic hash based on the non-zero random value and the session random value, and comparing the reference cryptographic hash to the cryptographic hash corresponding with the one or more caveats of the clock update token. In some embodiments, the clock update token may comprise a macaroon.

In some embodiments, updating the real-time clock may include updating the real-time clock based on a received update time command. In some embodiments, updating the real-time clock may include updating the real-time clock based on the received update time in response to successful authentication of the clock update token and a determination that the real-time clock has not been set. In some embodiments, authenticating the clock update token may include confirming one or more caveats of the clock update token are valid. In some embodiments, authenticating the clock update token may include determining whether the real-time clock has been set based on a clock status flag.

In some embodiments, communicating the wireless advertisement may include communicating a Bluetooth Low Energy advertisement, wherein establishing the wireless communication connection may include establishing a Bluetooth Low Energy session with the computing device, and the session random value may be associated with the Bluetooth Low Energy session. In some embodiments, the method may further include receiving, by the access control device and from the computing device, a request to control the access control device in response to updating the real-time clock, and the request may include a caveated cryptographic bearer token that includes a time-based caveat that defines a time limit for control of the access control device. In some embodiments, the computing device may be a guest mobile computing device and the access control device may be a lock device. In some embodiments, the update time command may be received from the computing device.

According to another aspect, a method may include establishing, by a computing device, a wireless communication connection with an access control device in response to receipt of a wireless advertisement from the access control device identifying a clock status of a real-time clock of the access control device, wherein the clock status includes a non-zero random value indicating that the real-time clock has not been set, receiving, by the computing device, a session random value from the access control device, transmitting, by the computing device, a request for a clock update token to a server, wherein the request includes the non-zero random value and the session random value, receiving, by the computing device, the clock update token from the server, wherein the clock update token is based on a hash of the non-zero random value and the session random value and includes a clock update caveat that limits access control permissions of the computing device over the access control device to updating the real-time clock of the access control device, and transmitting, by the computing device, the clock update token to the access control device to update the real-time clock in response to confirmation of successful authentication of the clock update token by the access control device.

In some embodiments, the clock update token may include a caveated cryptographic bearer token that includes the clock update caveat and one or more caveats corresponding with a cryptographic hash generated based on the non-zero random value and the session random value. In some embodiments, the clock update token may comprise a macaroon. In some embodiments, establishing the wireless communication connection may include establishing a Bluetooth Low Energy session with the access control device in response to receipt of a Bluetooth Low Energy advertisement from the access control device, and the session random value may be associated with the Bluetooth Low Energy session. In some embodiments, the method may further include transmitting, from the computing device to the access control device, a request to control the access control device subsequent to transmittal of the clock update command, and the request may include a caveated cryptographic bearer token that includes a time-based caveat that defines a time limit for control of the access control device. In some embodiments, the computing device may be a guest mobile computing device, the access control device may be a lock device, and the server may be a cloud-based server.

According to yet another embodiment, an access control system may include at least one processor, and at least one memory comprising a plurality of instructions stored thereon that, in response to execution by the at least one processor, causes the access control device to communicate a Bluetooth Low Energy advertisement with an access control device, wherein the Bluetooth Low Energy advertisement identifies a clock status of a real-time clock of the access control device, and wherein the clock status includes a non-zero random value indicating that the real-time clock has not been set, establish a Bluetooth Low Energy session between the access control device and a computing device in response to the Bluetooth Low Energy advertisement, transmit a session random value from the access control device to the computing device, receive a clock update token by the access control device from the computing device, wherein the clock update token is indicative of an authority of the computing device to update the real-time clock of the access control device, authenticate the clock update token by the access control device based on the non-zero random value and the session random value, and update the real-time clock by the access control device based on a received update time in response to successful authentication of the clock update token.

In some embodiments, the clock update token may include a caveated cryptographic bearer token that includes a clock update caveat that limits access control permissions of the computing device over the access control device to updating the real-time clock of the access control device and one or more caveats corresponding with a cryptographic hash generated based on the non-zero random value and the session random value. Further, in some embodiments, authentication of the clock update token may include generating a reference cryptographic hash based on the non-zero random value and the session random value and comparing the reference cryptographic hash to the cryptographic hash corresponding with the one or more caveats of the clock update token.

Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

FIGS. 7 and 8 illustrate at least one embodiment of various data associated with the generation of a clock update token.

DETAILED DESCRIPTION

Figure 1:
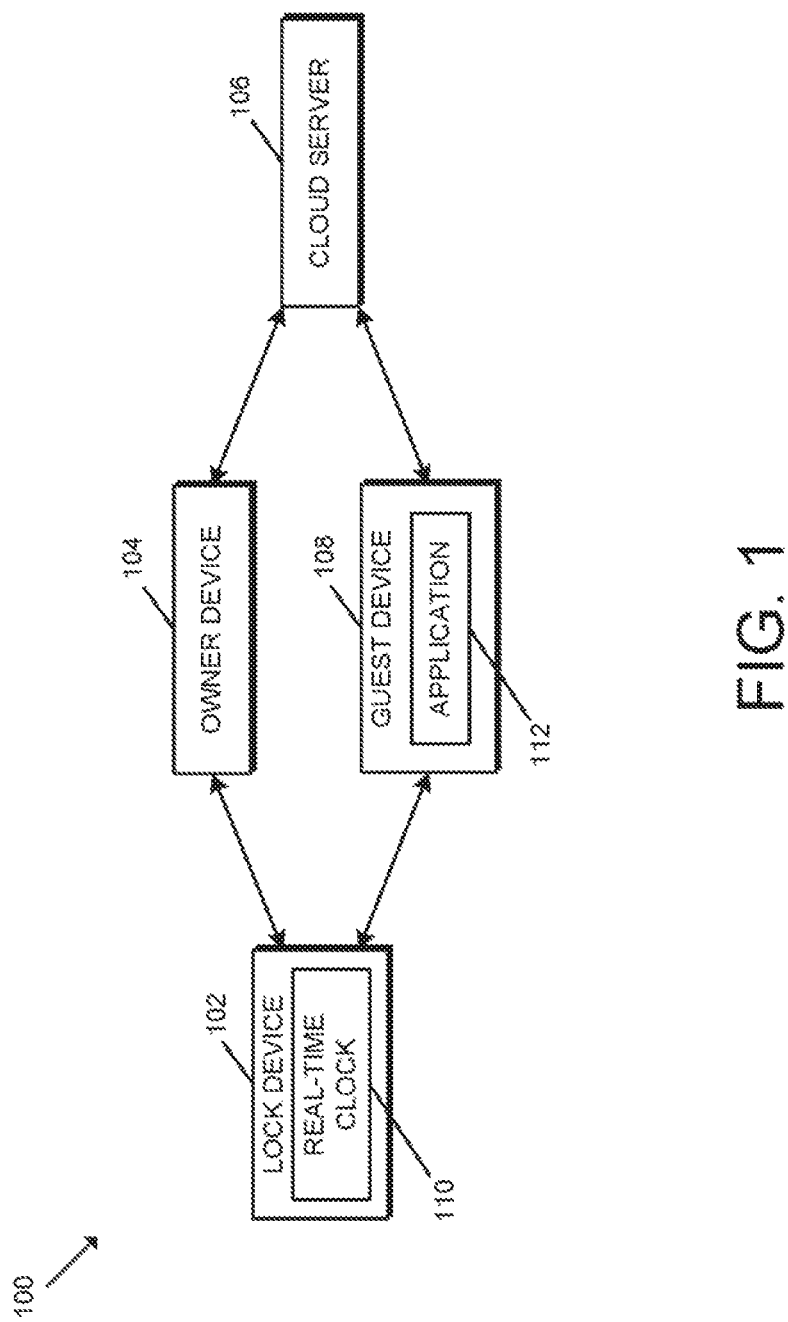
FIG. 1 is a simplified block diagram of at least one embodiment of an access control system for secure real-time clock updates.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, an access control system 100 for securely updating a real-time clock includes a lock device 102, an owner device 104, a cloud server 106, and a guest device 108.

As described in U.S. patent application Ser. No. 15/656,641 filed on Jul. 21, 2017 (hereinafter "Flexible Distributed Tokens Application"), the entirety of which is incorporated herein by reference, the access control system 100 allows for flexible access control over offline lock devices 102 and/or other access control devices. For example, in some embodiments, the owner of a lock device 102 may invite others (guests) to gain entry to a facility without having a connection to the facility's locks and/or readers. To do so, the access control system 100 may utilize connectivity to a cloud server 106 that distributes caveated cryptographic bearer tokens (e.g., macaroons) to an owner device 104 and/or guest devices 108 for use with a specified lock device. It should be further appreciated that the lock device 102 is not required to locally store an access control list of authorized users. Instead, the lock device 102 may store a base macaroon (or other base cryptographic bearer token), which may be compared (e.g., directly or indirectly) to derived macaroons or contextual cryptographic bearer tokens to determine whether a particular user/device should be granted access/control.

The access control system 100 may leverage the flexibility associated with contextual cryptographic bearer tokens (e.g., macaroons) for access control. For example, the lock device 102 and the owner device 104 may communicate with one another during a setup or registration process in which a base cryptographic bearer token (e.g., a base macaroon) with a base set of restrictions is generated (e.g., a valid after date/time, a particular security model, etc.). Once generated and submitted to the cloud server 106, the cloud server 106 may append additional caveats to the base cryptographic bearer token and its restrictions, for example, to reduce the duration the token is valid or limit the permissions given to a particular user/guest. In particular, in doing so, the cloud server 106 may employ a cryptographic hash function (e.g., an HMAC) to hash the additional caveats to the base cryptographic bearer token to generate a derived or caveated cryptographic bearer token (e.g., a derived macaroon). It should be appreciated that, in the illustrative embodiment, the additional caveats may only modify the base token to be more restrictive than the base token, which prevents a guest, for example, from obtaining greater privileges than the owner of the lock device 102.

It should be appreciated that the access control system 100 may utilize cryptographic bearer tokens that have relatively short-lived (i.e., time-limited) access permissions (e.g., to prevent the tokens from being captured and re-used indefinitely). However, as indicated above, various conditions can result in the real-time clock 110 of a particular lock device 102 being reset (e.g., after battery replacement, certain updates, and/or unexpected resets). As such, a time-expiring token such as a caveated bearer token of a guest device 108 may be rejected by the lock device 102 (e.g., when it detects that the real-time clock 110 has not been set after a reset event). In some embodiments, an owner device 104 and/or other device that includes a cryptographic bearer token with a time-based caveat may be able to gain access to the lock device 102 in order to update the real-time clock 110 of that lock device 102. Further, in some embodiments, the guest device 108, owner device 104, and/or other suitable device in the access control system 100 may be provided a clock update token that authorizes the device to update the real-time clock 110 of the lock device 102. As such, it should be appreciated that the clock update token and the techniques described herein permit non-owners to update the time without providing the base cryptographic bearer token while still enforcing security for the user's less-privileged authority. Although the clock update token is described herein as being transmitted to a guest device 108 for updating the real-time clock 110 of the lock device 102, it should be appreciated that the techniques described herein apply equally well to transmitting the clock update token to the owner device 104 and/or other suitable device for updating the real-time clock 110 of the lock device 102.

As described herein, the illustrative embodiment, the clock update token includes a caveat that limits the access permissions associated with that token to updating the real-time clock 110. However, in other embodiments, it should be appreciated that the clock update token may further permit the bearer device to perform one or more additional functions associated with the lock device 102 (e.g., access certain data). Further, in some embodiments, one or more ephemeral device-specific pieces of authentication data (e.g., random values) may be incorporated into one or more caveats added to the base cryptographic bearer token to obfuscate the base token and prevent replay attacks. It should be further appreciated that the clock update token and the techniques described herein may allow for seamless operation for the user, one-time user of the clock update token, lockout of other commands during use of the clock update token, replay attack prevention, the use of multiple guesses my a malicious actor, and/or other security benefits.

The guest device 108 includes an application 112 that enables a particular guest to register an account with the cloud server/service, request and/or receive an invitation from the owner to access/control a particular lock device 102, request and/or receive caveated cryptographic bearer tokens (e.g., macaroons) for access/control of particular lock devices 102, interact with the lock devices 102, and request/ utilize a clock update token to update the real-time clock 110 of the lock device 102. In the illustrative embodiment, the real-time clock 110 is updated such that it is synchronous with or otherwise corresponds with an external clock (e.g., a clock of the guest device 108 and/or the cloud server 106). It should be appreciated that the application 112 may be embodied as any suitable application for performing the functions described herein. For example, in some embodiments, the guest device 108 is embodied as a mobile device. In such embodiments, the application 112 may be embodied as a mobile application (e.g., a smartphone application). In some embodiments, it should be appreciated that the application 112 may serve as a client-side user interface for a web-based application or service of the cloud server 106.

As described in detail below, in the illustrative embodiment, the owner device 104 and the guest device 108 are embodied as mobile devices, and the lock device 102 may communicate with the owner device 104 and the guest device 108 over any suitable wireless communication connection (e.g., Bluetooth, Wi-Fi, etc.) established between the lock device 102 and the device 104, 108. Additionally, in the illustrative embodiment, the owner device 104 and the guest device 108 may communicate with the cloud server 106 using any suitable wireless communication connection. For example, in various embodiments, the owner device 104 and/or the guest device 108 may communication with the cloud server 106 over Wi-Fi, WiMAX, a WAN (e.g., the Internet), and/or a suitable telecommunications network/protocol. As such, it should be appreciated that the illustrative cloud server 106 is located at one or more remote locations relative to the devices 102, 104. In other embodiments, it should be appreciated that one or more of the communication connections may be wired.

In some embodiments, the access control system 100 may include a gateway device (e.g., used in conjunction with third-party integrations with the access control system 10K). Further, in some embodiments, one or more of the owner devices 104 and/or guest devices 108 may be embodied as a shared device or user interface device that permits a user to interact with the cloud server 106, the lock device 102, and/or cloud-based solutions. For example, one or more of the devices 104, 108 may be embodied as a home assistant device or smart home hub. In some embodiments, the access control system 100 may include an ambient voice interface or other shared user interface instead of a user-owned graphical user interface. Further, in some embodiments, the access control system 100 may be accessed by virtue of a cloud-to-cloud integration with a third party integrator.

It should be appreciated that each of the lock device 102, the owner device 104, the cloud server 106, and/or the guest device 108 may be embodied as a computing device similar to the computing device 200 described below in reference to FIG. 2. For example, in the illustrative embodiment, each of the lock device 102, the owner device 104, the cloud server 106, and the guest device 108 includes a processing device 202 and a memory 206 having stored thereon operating logic 208 for execution by the processing device 202 for operation of the corresponding device. Additionally, although the lock device 102 is described herein for clarity of the description as a "lock device," it should be appreciated that, in other embodiments, the lock device 102 may be embodied as any access control device suitable for performing the functions described herein. As such, the description of the lock device 102 is equally applicable to embodiments of the access control system 100 having a different type of access control device.

It should be further appreciated that, although the cloud server 106 is described herein as a cloud-based device or collection of devices, in other embodiments, the cloud server 106 may be embodied as one or more devices outside of a cloud computing environment. Further, in some embodiments, the cloud server 106 may be embodied as a "serverless" or server-ambiguous computing solution, for example, that executes a plurality of instructions on-demand, contains logic to execute instructions only when prompted by a particular activity/trigger, and does not consume computing resources when not in use. That is, the cloud server 106 may be embodied as a virtual computing environment residing "on" a computing system (e.g., a distributed network of devices) in which various virtual functions (e.g., Lamba functions, Azure functions, Google cloud functions, and/or other suitable virtual functions) may be executed corresponding with the functions of the cloud server 106 described herein. For example, when an event occurs (e.g., a user presses a button in an application to unlock the lock device 102), the application may contact the virtual computing environment (e.g., via an HTTPS request to an API of the virtual computing environment), whereby the API may route the request to the correct virtual function (e.g., a particular server-ambiguous computing resource) based on a set of rules. As such, when a request for a caveated cryptographic bearer token is made, the appropriate virtual function(s) may be executed to determine if that user should receive access to the lock device 102, mint the appropriate caveated cryptographic bearer token, and transmit that information back to the user before eliminating the instance of the virtual function(s).

Although only one lock device 102, one owner device 104, one cloud server 106, and one guest device 108 are shown in the illustrative embodiment of FIG. 1, the access control system 100 may include multiple lock devices 102, owner devices 104, cloud servers 106, and/or guest devices 108 in other embodiments. For example, a guest with permission to access/control a particular lock device 102 may securely connect with the cloud server 106 via any suitable guest device 108 to request and receive a caveated cryptographic bearer token for access to the lock device 102 and/or a clock update token to update the real-time clock 110 of that lock device 102. Further, in some embodiments, a particular owner and/or guest may have access to multiple lock devices 102. As such, it should be appreciated that, in some embodiments, a particular user may be an owner of one lock device 102 and a guest with respect to another lock device 102. Similarly, a particular device may be an owner device 104 or a guest device 108 depending on the particular person (and login credentials thereof) using the device. In some embodiments, it should be appreciated that the cloud server 106 may be embodied as multiple servers in a cloud computing environment.

It should be appreciated that the cryptographic bearer tokens described herein may include or be embodied as macaroons. It should be appreciated that a macaroon is a data structure that can have caveats appended to it, for example, to limit time access and privilege level of a user of a lock device 102. When the lock device 102 is paired with the owner device 104 (e.g., during a one-time action unless a factory default reset occurs to reset data on the lock device 102), the lock device 102 may generate a macaroon that is transmitted to the owner device 104 and forwarded to the cloud server 106. The macaroon may be composed of a security key and caveats associated with a macaroon type (e.g., owner, admin/manager, and user/guest) and a time-stamp indicating a creation time of the macaroon. Further, in some embodiments, the macaroon may include a caveat associated with a function of the macaroon (e.g., what the macaroon is intended to do). The security key may be based, for example, on a SPAKE key generated during the pairing between the lock device 102 and the owner device 104. In other embodiments, another suitable key may be used for the macaroon. The permitted values for the time-based caveat may vary depending on the particular embodiment. For example, in some embodiments, the time-based caveat may allow time/expiration limits of one hour, twenty-four hours, thirty days, or absolute/non-expiring. In other embodiments, any suitable time limits may be used. It should be appreciated that, in the illustrative embodiment, the time limits define the amount of time that may elapse from the generation of the macaroon (e.g., defined by a timestamp in the macaroon) before the macaroon is considered to be expired.

In some embodiments, the base macaroon, base, may be generated according to base={base_caveats|base_tag}, where base_caveats is a concatenated string of the caveats of the base macaroon, base_tag=HMAC(key,base_caveats), and HMAC is a keyed-hash message authentication code of the base_caveats using key as the cryptographic key for the hash. As indicated above, it should be appreciated that any suitable keys may be used for the generation of the base macaroon. Further, as described herein, a macaroon may also be derived from the base macaroon (e.g., for transmittal to a guest device 108) thereby narrowing the permissions of the base macaroon (e.g., further including time-limiting and/or permission-limiting caveats). For example, a derived macaroon, guest, may be generated according to guest=HMAC(base_tag,guest_caveats)=HMAC(HMAC(key,base_caveats),guest_caveats), where guest_caveats is a concatenated string of the additional caveats defining the guest's access control permissions. In other embodiments, it should be appreciated that the caveats may be appended/incorporated into the derived macaroon (or other caveated cryptographic bearer token) in a sequential manner (e.g., hashing each new contextual caveat onto the macaroon sequentially) as described below. It should be further appreciated that the macaroons may further incorporate caveats associated with a particular session and/or other suitable information.

Figure 2:
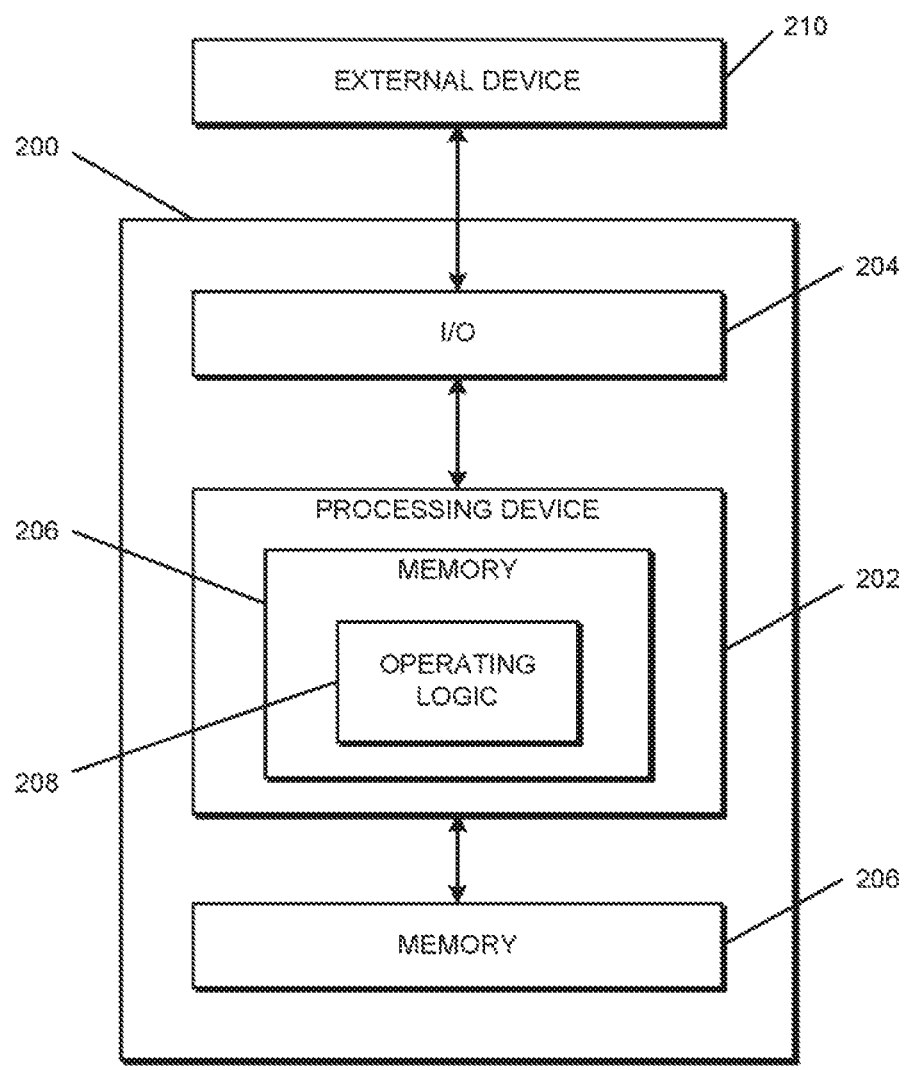
FIG. 2 is a simplified block diagram of at least one embodiment of a computing system.

Referring now to FIG. 2, a simplified block diagram of at least one embodiment of a computing device 200 is shown. The illustrative computing device 200 depicts at least one embodiment of a lock device, owner device, cloud server, and/or guest device that may be utilized in connection with the lock device 102, the owner device 104, the cloud server 106, and/or the guest device 108 illustrated in FIG. 1. Depending on the particular embodiment, computing device 200 may be embodied as a reader device, credential device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the lock device 102, the owner device 104, the cloud server 106, and/or the guest device 108. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

In some embodiments, the illustrative lock device 102 includes a lock mechanism that is configured to control access through a passageway. For example, in some embodiments, the lock mechanism may be configured to be positioned in a locked state in which access to the passageway is denied, or may be positioned in an unlocked state in which access to the passageway is permitted. In some embodiments, the lock mechanism includes a deadbolt, latch bolt, lever, and/or other mechanism adapted to move between the locked and unlocked state and otherwise perform the functions described herein. However, it should be appreciated that the lock mechanism may be embodied as any another mechanism suitable for controlling access through a passageway in other embodiments.

Figure 3:
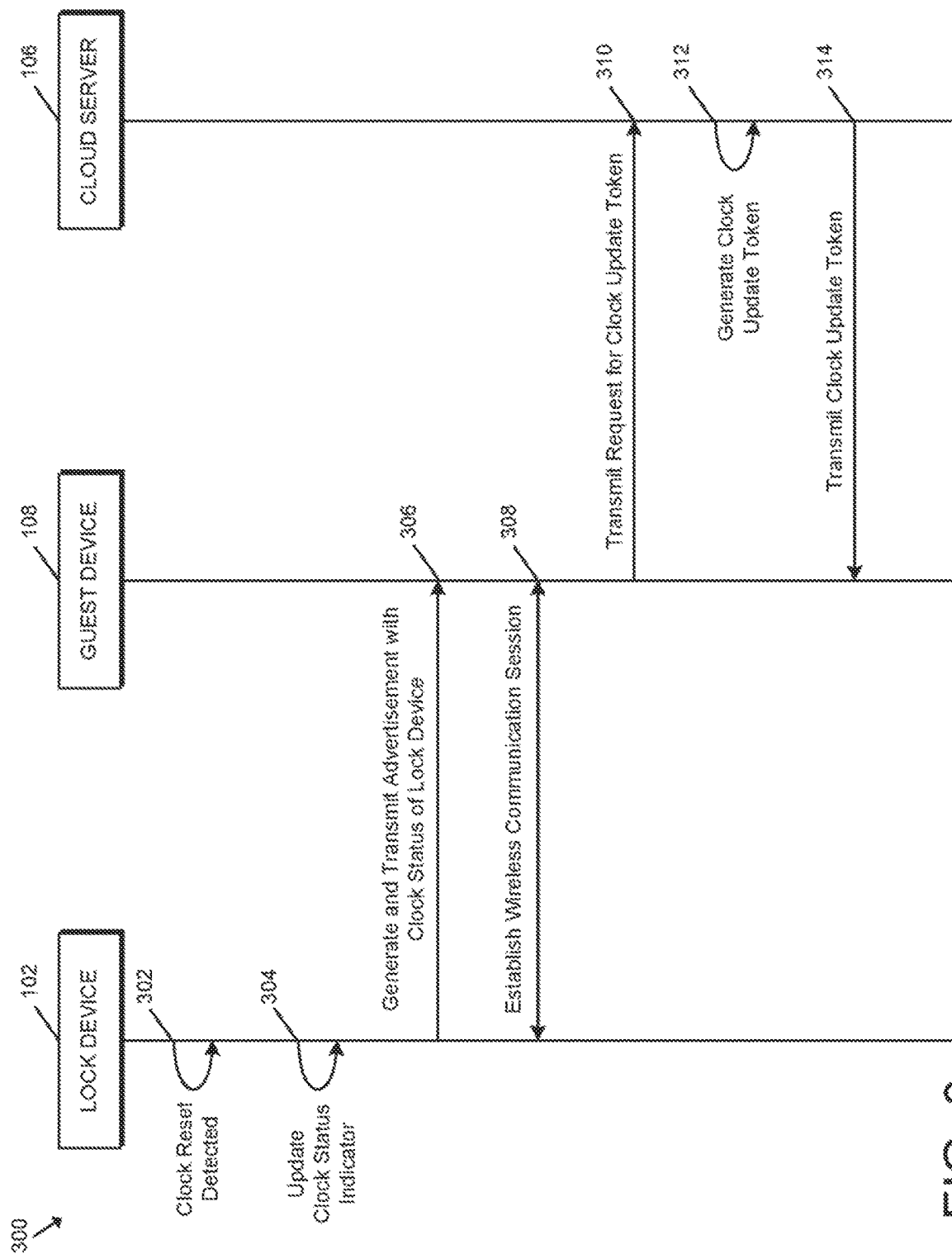
FIGS. 3 and 4 are a simplified flow diagram of at least one embodiment of a method for securely updating a real-time clock.
Figure 4:
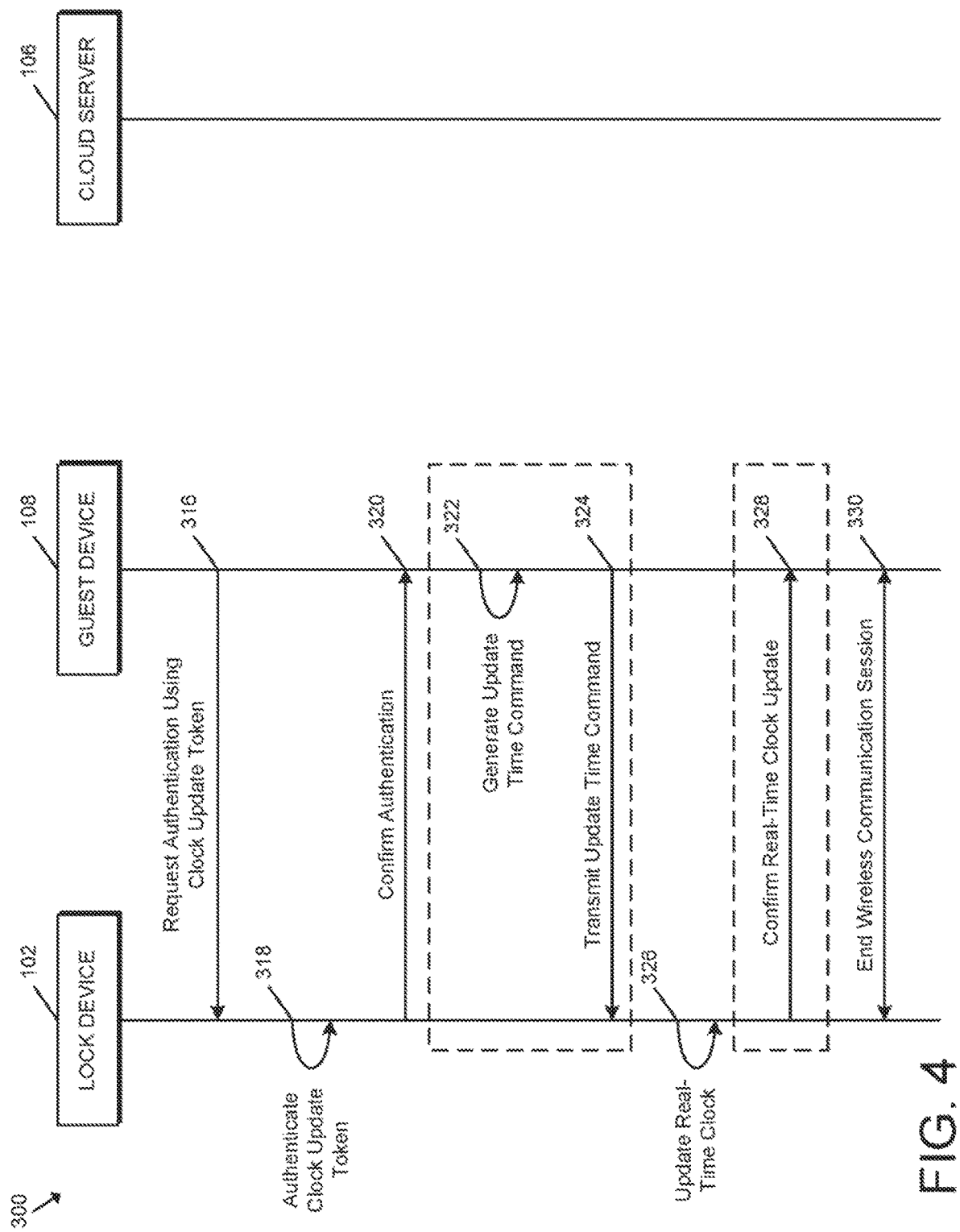

Referring now to FIGS. 3-4, in use, the access control system 100 may execute a method 300 for securely updating the real-time clock 110 of the lock device 102. It should be appreciated that the particular sub-flows of the method 300 are illustrated by way of example, and such sub-flows may be combined or divided, added or removed, and/or reordered in whole or in part depending on the particular embodiment, unless stated to the contrary. The illustrative method 300 begins with sub-flow 302 in which the lock device 102 detects that the real-time clock 110 has been reset. For example, as described above, the real-time clock 110 may have been reset in response to replacement of the batteries in the lock device 102, certain updates to the lock device 102 (e.g., certain hardware, software, and/or firmware updates), an unexpected reset (e.g., from a hardware malfunction), and/or in response to another reset condition. It should be appreciated that the lock device 102 may detect the clock reset based on any suitable technique and/or mechanism.

In sub-flow 304, the lock device 102 updates a clock status indicator of the lock device 102 to indicate the state of the real-time clock 110. In particular, the lock device 102 may update the clock status indicator to indicate that the real-time clock 110 was reset (e.g., to its default value) and/or that the real-time clock 110 has not yet been set subsequent to the clock reset. In some embodiments, it should be appreciated that the clock status indicator may be embodied as a clock status flag or a clock status bit in which a cleared flag or a zero-valued bit indicates that the real-time clock 110 has not yet been set. Alternatively, in other embodiments, a set flag or one-valued bit may indicate that the real-time clock 110 has not yet been set in other embodiments. It should be appreciated that the clock status indicator may be embodied as another indicator suitable for performing the functions described herein in other embodiments.

In sub-flow 306, the lock device 102 generates and transmits a wireless advertisement to other wireless devices in the vicinity of the lock device 102 (e.g., including the guest device 108). For example, in some embodiments, the lock device 102 generates and transmits a Bluetooth Low Energy (BLE) advertisement, which may include advertising data similar to the advertising data depicted in FIG. 7. In the illustrative embodiment, the advertisement identifies a clock status of the real-time clock 110 of the lock device 102. More specifically, in some embodiments, the lock device 102 may generate a zero value if the real-time clock 110 has been set or a non-zero random value (e.g., a one-byte value) if the real-time clock 110 has not been set, and include the corresponding value (i.e., the zero value or the non-zero random value) in the advertisement to convey the clock status to other devices (see, for example, data 702 of FIG. 7). The non-zero random value may serve as proof, for example, that the real-time clock 110 of the lock device 102 needs to be set. It should be appreciated that, if the guest device 108 is within the appropriate communication range of the lock device 102 (e.g., BLE communication range), the guest device 108 is able to receive the advertisement and respond to establish a wireless communication connection accordingly. In other embodiments, it should be appreciated that the value indicating that the real-time clock 110 has not been set (e.g., the clock status value) may be non-random. For example, in some embodiments, the lock device 102 may generate and utilize a non-random non-zero value to indicate that the real-time clock 110 has not been set. In some embodiments, the non-random non-zero value may be a predetermined or calculable value. It should be further appreciated that, in some embodiments, a zero value may be indicative of the real-time clock 110 not being set, and a non-zero value may indicate that it has been set. Further, in embodiments in which the clock status indicator is a value, the clock status value may be the same as the clock status indicator. For simplicity and clarity of the description, the clock status value is primarily referred to herein as a non-zero random value. However, the techniques described herein are equally applicable to embodiments in which the corresponding clock status value is not random and/or not non-zero.

In sub-flow 308, the lock device 102 and the guest device 108 establish a wireless communication session with one another based on the transmitted wireless advertisement. For example, in some embodiments, the lock device 102 and the guest device 108 establish a BLE session. In doing so, it should be appreciated that the lock device 102 may generate and transmit a session random value (e.g., a 12-byte value) to the guest device 108 (see, for example, the session random value of FIG. 7). In some embodiments, the session random value may be generated based on, or otherwise associated with, the current wireless communication session established between the lock device 102 and the guest device 108. For example, in embodiments in which BLE communication is employed, the session random value may be associated with the established BLE session. It should be appreciated that the session random value may serve as proof, for example, that the clock update token (after generation) is subsequently being used within the same wireless communication session in which it was requested and generated. In other words, in some embodiments, the clock update token may be limited to a particular lock device 102 and to a particular session. Further, in some embodiments, the wireless communication session may be significantly time-limited (e.g., one minute) to ensure that an old clock update token is not being used to update the real-time clock 110. In some embodiments, the lock device 102 may transmit the session random value to the guest device 108 while establishing the session (e.g., as part of the session confirmation), whereas in other embodiments, the lock device 102 may transmit the session random value to the guest device 108 subsequent to establishing the session.

In sub-flow 310, the guest device 108 transmits a request for a clock update token to the cloud server 106 (e.g., including the non-zero random value and the session random value), and in sub-flow 312, the cloud server 106 generates the clock update token based on the request. To do so, the access control system 100 or, more specifically, the cloud server 106 may execute a method 500 of FIG. 5.

Figure 5:
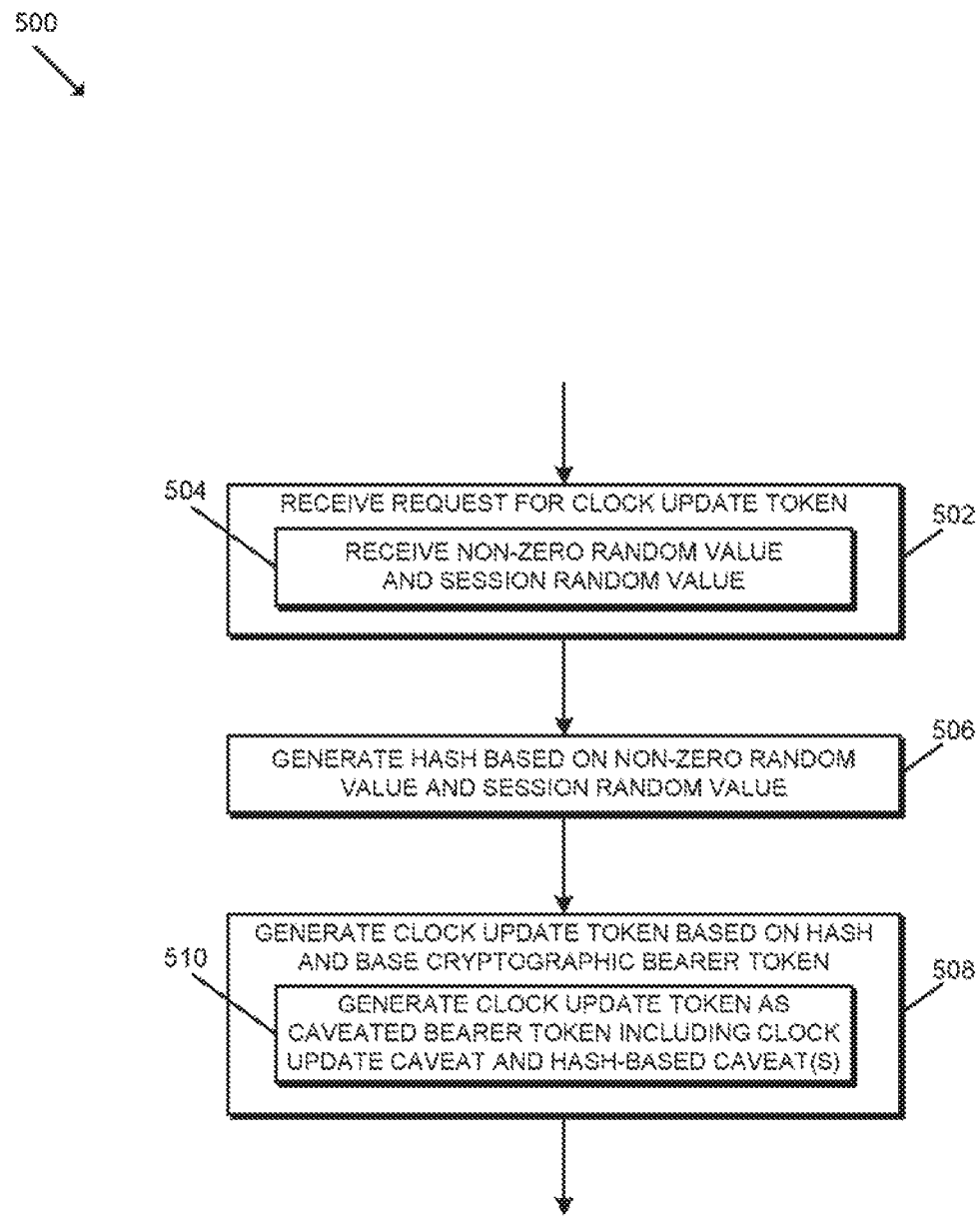
FIG. 5 is a simplified flow diagram of at least one embodiment of a method for generating a clock update token.

Referring now to FIG. 5, in use, the cloud server 106 may execute a method 500 for generating a clock update token. It should be appreciated that the particular blocks of the method 500 are illustrated by way of example, and such blocks may be combined or divided, added or removed, and/or reordered in whole or in part depending on the particular embodiment, unless stated to the contrary. The illustrative method 500 begins with block 502 in which the cloud server 106 receives a request for a clock update token from the guest device 108 (see sub-flow 310 of FIG. 3). In doing so, in block 504, the cloud server 106 may receive (e.g., as part of the request) the non-zero random value and the session random value generated by the lock device 102 and previously transmitted to the guest device 108.

In block 506, the cloud server 106 generates a cryptographic hash based on the non-zero random value and the session random value received from the guest device 108. For example, in some embodiments, the cloud server 106 may concatenate the non-zero random value (e.g., a one byte value) to the session random value to form a concatenated value to hash, and generate a cryptographic hash of the concatenated value (see, for example, the non-zero random value 702, session random value, value to hash, and hashed value of FIG. 7). In particular, in the illustrative embodiment, the cloud server 106 generates a SHA256 cryptographic hash of the concatenated value, which outputs a 32-byte (256-bit) hash value. However, it should be appreciated that the cloud server 106 may utilize another suitable hash algorithm in other embodiments. As indicated above, in some embodiments, the non-zero random value may be embodied as another suitable type of clock status value (e.g., a non-random value). In such embodiments, it should be appreciated that the hash may be generated with or without the clock status value concatenated to the session random value depending on the particular embodiment. For example, in some embodiments, the non-random clock status value may be appended to the session random value prior to generating the hash, whereas in other embodiments, the hash may be generated based on only the session random value.

In block 508, the cloud server 106 generates a cloud update token based on the generated hash value and the base cryptographic bearer token (e.g., base macaroon) associated with the lock device 102 (see sub-flow 312 of FIG. 3). More specifically, in block 510, the cloud server 106 may generate the clock update token as a caveated cryptographic bearer token including a clock update caveat and one or more hash-based caveats (i.e., caveat(s) based on the generated hash value). In particular, in the illustrative embodiment, the cloud server 106 retrieves the base cryptographic bearer token associated with the lock device 102 and generates a caveated cryptographic bearer token based on that base cryptographic bearer token. It should be appreciated that, in the illustrative embodiment, the clock update caveat may limit the access control permissions of the guest device 108 over the lock device 102 to updating the real-time clock 110 of the lock device 102. That is, in the illustrative embodiment, the access control permissions of the bearer of the clock update token are limited to updating the real-time clock 110. In other embodiments, the clock update token may authorize one or more additional functions (e.g., specific data access) as described above. Additionally, in some embodiments, the clock update token may further include a timestamp caveat that identifies an appropriate time basis for the real-time clock 110 of the lock device 102. For example, in some embodiments, the timestamp caveat may identify the current time as understood by the cloud server 106 (e.g., based on a real-time clock of the cloud server 106).

Although the blocks 502-510 are described in a relatively serial manner, it should be appreciated that various blocks of the method 500 may be performed in parallel in some embodiments.

It should be appreciated that, in some embodiments, the data structure of the cryptographic bearer tokens (e.g., macaroons) may only permit a limited amount of data to be included for each contextual caveat. In such embodiments, the cloud server 106 may deconstruct or split caveats having a greater amount of data into parts for sequential incorporation into the caveated cryptographic bearer token (e.g., derived macaroons). For example, in some embodiments, nonce caveats of a macaroon may be limited to a 4-byte maximum per caveat. Accordingly, in such embodiments, the cloud server 106 may break the 32-byte hash, for example, into eight separate caveats for sequential incorporation into the caveated cryptographic bearer token in order to generate the clock update token.

Referring now to FIG. 8, an example of a base cryptographic bearer token and clock update token are shown (in addition to an intermediate caveated cryptographic bearer token including a clock update token but not yet including the hash-based caveats). In particular, the various illustrative tokens of FIG. 8 are embodied as macaroons, which are represented in Concise Binary Object Representation (CBOR) format and hexadecimal representations. However, it should be appreciated that the techniques described herein may be employed for different data representations and/or data structures.

As shown, the illustrative base cryptographic bearer token (e.g., base macaroon) of FIG. 8 includes various data fields. In particular, the base cryptographic bearer token includes data 802a, 804a, 806, 808, 810, 812a. In the illustrative embodiment, the data 802a indicates (via "20") that there are 32 CBOR bytes that follow, and the data 804a indicates (via "83") that the token includes a total of three caveats. The data 806 is the first contextual caveat of the token, which is directed to the type of the token (e.g., a kUwMacaroonCaveatTypeClientAuthorizationTokenV1 type caveat). The data 806 indicates (via "43") that three CBOR bytes follow and includes those three CBOR bytes representing that caveat. The data 808 is the second contextual caveat of the token, which is a timestamp of the token (e.g., a kUwMacaroonCaveatTypeDelegationTimestanp type caveat). The data 808 indicates (via "46") that six CBOR bytes follow and includes those six CBOR bytes identifying the caveat type and representing the timestamp of the token. The data 810 is the third contextual caveat of the token, which indicates a service type of the token (e.g., a kUwMacaroonCaveatCloudServiceldNotCloudRegistered type caveat). The data 810 indicates (via "42") that two CBOR bytes follow and includes those two CBOR identifying the service type and representing the service. The data 812a is the HMAC of the base cryptographic bearer token. Specifically, the data 812a includes a marker ("50") and is followed by the HMAC. As described above, the HMAC of a macaroon is chained and based on the various caveats. As such the data 812a-c changes as successive caveats are added to the macaroon.

The caveated cryptographic bearer token including the clock update caveat of FIG. 8 illustrates an intermediate token after the clock update token has been added to the base cryptographic bearer token but the hash-based caveats have not yet been added. It should be appreciated that the data 806, 808, 810, which represents the three previously added caveats does not change when the clock update caveat is added. However, the data 802b now indicates (via "22") that there are 34 CBOR bytes that follow, and the data 804b now indicates (via "84) that the token includes a total of four caveats. The data 814 is the fourth contextual caveat of the token (i.e., the clock update caveat), which limits the token to updating the real-time clock 110 of the lock device 102. As indicated above, the data 812b is the HMAC of the intermediate token, which has been updated after the addition of the clock update caveat.

The clock update token of FIG. 8 illustrates the clock update token after the clock update caveat and the hash-based caveats have been added to the base token. As indicated above, in the illustrative embodiment, the 32-byte hash value has been broken into eight different 4-byte hash elements. As shown in FIG. 8, each of those 4-byte hash elements has been successively hashed to create the clock update token. Similar to the intermediate token, the previously added caveats (i.e., the data 806, 808, 810, 814) have not changed. However, the data 802c now indicates (via "5A") that there are 90 CBOR bytes that follow, and the data 804c now indicates (via "8C") that the token includes a total of 12 caveats. Each of the data 816, 818, 820, 822, 824, 826, 828, 830 is a contextual caveat that has been successively hashed to the corresponding intermediate token. Each of the data 816, 818, 820, 822, 824, 826, 828, 830 indicates (via "46 00 44") that it is directed to a hash-based caveat and subsequently includes that 4-byte caveat. Again, the data 812c is the HMAC of the clock update token, which has been updated after the addition of each of the hash-based caveats.

As indicated above, in some embodiments, the clock update token may further include a timestamp caveat that identifies an appropriate time basis for the real-time clock 110 of the lock device 102. In such embodiments, the timestamp caveat may be further hashed to the caveated cryptographic token of FIG. 8 including the clock update caveat and the hash-based caveats in a manner similar to that described above. In doing so, in the illustrative embodiment, it should be appreciated that the previously added caveats (i.e., the data 806, 808, 810, 814, 816, 818, 820, 822, 824, 826, 828, 830) does not change when the timestamp caveat is added. However, the data 802c is updated, for example, to indicate (via "61") that there are 97 CBOR bytes that follow, and the data 804c is updated, for example, to indicate (via "8D" that the token includes a total of 13 caveats. In some embodiments, the timestamp caveat may be hashed to the token and positioned between the last hashed caveat 830 and the HMAC 812c. Again, the data 812c is updated based on an HMAC of the clock update token after the addition of the timestamp caveat. In some embodiments, the timestamp caveat may indicate (via "46 08 1A") that it is directed to a timestamp caveat and subsequently includes a 4-byte timestamp caveat. In particular, in some embodiments, the timestamp caveat may be represented as a uint32_t value (e.g., a 32-bit timestamp in seconds since January 2000). However, it should be appreciated that the timestamp value may be otherwise represented in other embodiments. Further, it should be appreciated that one or more of the caveats may be presented in a different order than the order of FIG. 8.

Referring back to FIG. 3, in sub-flow 314, the cloud server 106 transmits the generated clock update token to the guest device 108. It should be appreciated that the clock update token is indicative of the authority of the guest device 108 to update the real-time clock 110 of the lock device 102. In sub-flow 316 of FIG. 4, the guest device 108 requests authentication of the clock update token. In other words, in some embodiments, the guest device 108 transmits the clock update token to the lock device 102 and requests permission to update the real-time clock 110 of the lock device 102 based on the clock update token. In sub-flow 318, the lock device 102 authenticates the clock update token based on the previously generated non-zero random value (or other clock status value) and the session random value and, if successful, confirms the authentication to the guest device 108 in sub-flow 320. To do so, the lock device 102 may execute a method 600 of FIG. 6.

Figure 6:
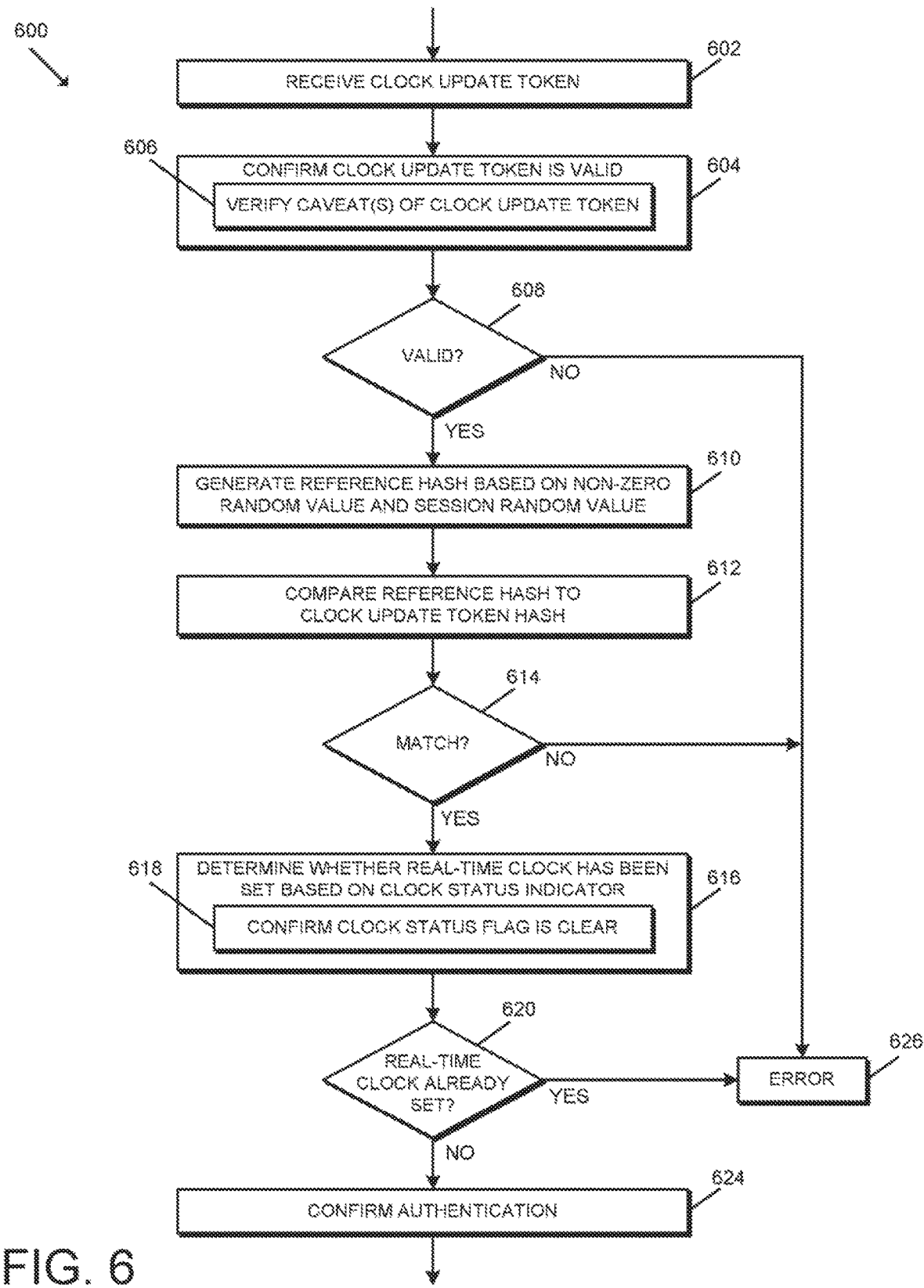
FIG. 6 is a simplified flow diagram of at least one embodiment of a method for authenticating a clock update token.

Referring now to FIG. 6, in use, the lock device 102 may execute a method 600 for authenticating a clock update token. It should be appreciated that the particular blocks of the method 600 are illustrated by way of example, and such blocks may be combined or divided, added or removed, and/or reordered in whole or in part depending on the particular embodiment, unless stated to the contrary. The illustrative method 600 begins with block 602 in which the lock device 102 receives the clock update token from the guest device 108 (see sub-flow 316 of FIG. 4). In block 604, the lock device 102 confirms that the clock update token is valid. In doing so, in block 606, the lock device 102 may verify one or more caveats of the clock update token. For example, in some embodiments, the lock device 102 may confirm that one or more of the caveats of the clock update token is valid (e.g., the timestamp caveat). Further, in some embodiments, the lock device 102 may compute the HMAC of the data stored in the clock update token for comparison to the HMAC provided with the clock update token (see, for example, the data 812a-c of FIG. 8).

If the lock device 102 determines that the clock update token is valid in block 608, the method 600 advances to block 610 in which the lock device 102 generates a reference cryptographic hash based on the non-zero random value and the session random value previously generated by the lock device 102 (e.g., previously generated during the current wireless communication session). It should be appreciated that the reference cryptographic hash is generated based on the same hash algorithm used to previously generate the hash for incorporation into the clock update token (see block 506 of FIG. 5). As indicated above, in some embodiments, the non-zero random value may be embodied as another suitable type of clock status value (e.g., a non-random value). In such embodiments, it should be appreciated that the reference cryptographic hash may be generated according to the same technique used to generate the hash included in the clock update token.

In block 612, the lock device 102 compares the reference cryptographic hash to the hash value stored in the clock update token (see block 508 of FIG. 5). As indicated above, in the illustrative embodiment, it should be appreciated that the hash value stored in the clock update token was broken into an array of several hash elements (e.g., 4-byte hash elements) and successively hashed to the base token to generate the clock update token. As such, in some embodiments, in order to compare the reference hash value to the clock update token hash, the lock device 102 may reconstruct the clock update token hash from the hash elements included therein. Alternatively, the lock device 102 may break the reference hash value into hash elements for comparison to the hash elements of the clock update token. Further, in some embodiments, it should be appreciated that the comparison may involve an indirect comparison (e.g., a comparison between values derived from the reference value and the clock update token hash).

If the lock device 102 determines in block 614 that the reference hash matches the clock update token hash, the method 600 advances to block 616 in which the lock device 102 determines whether the real-time clock 110 has been set based on the clock status indicator. As indicated above, in some embodiments, the clock status indicator may be embodied as a clock status flag or a clock status bit in which a cleared flag or a zero-valued bit indicates that the real-time clock 110 has not yet been set. Accordingly, in block 618, the lock device 102 may confirm that the clock status flag is clear. It should be appreciated that the clock status indicator (e.g., clock status flag) may prevent authentication with a clock update token if the real-time clock 110 has already been set (e.g., via a previous use of a clock update token or via an owner device 104).

If the lock device 102 determines in block 620 that the real-time clock 110 has not already been set, the method 600 advances to block 624 in which the lock device 102 confirms the successful authentication to the guest device 108 (see sub-flow 320 of FIG. 4). However, if the lock device 120 determines in block 608 that the clock update token is not valid, determines in block 614 that the reference hash does not match the clock update token hash, or determines in block 620 that the real-time clock 110 has already been set, the method 600 advances to block 626 in which the lock device 102 performs one or more suitable error handling procedures.

Although the blocks 602-624 are described in a relatively serial manner, it should be appreciated that various blocks of the method 600 may be performed in parallel in some embodiments.

Returning to FIG. 4, in sub-flow 322, the guest device 108 generates an update time command that instructs the lock device 102 to update the real-time clock 110. In the illustrative embodiment, the update time command includes an updated real-time clock value to which the real-time clock 110 is to be changed. In some embodiments, the real-time clock value is determined based on a clock value of the guest device 108. In another embodiment, the real-time clock value is based on a clock value of the cloud server 106. For example, the real-time clock value may be determined based on a timestamp of the clock value of the cloud server 106 transmitted to the guest device 108. In other embodiments, it should be appreciated that the update time command may include a clock value associated with another suitable time basis.

In sub-flow 324, the guest device 108 transmits the update time command to the lock device 102 and, in sub-flow 326, the lock device 102 updates the real-time clock 110 based on the received time command. Further, in the illustrative embodiment, the lock device 102 updates the clock status indicator to indicate that the real-time clock 110 has been set. For example, in embodiments in which the clock status indicator is embodied as a clock status flag/bit, the lock device 102 may set the flag/bit. As such, subsequent attempts to update the real-time clock 110 may be denied as improper access attempts. Although the update time command is described herein as originating from the guest device 108, it should be appreciated that the cloud server 106 may transmit the update time command to the lock device 102 in other embodiments. In sub-flow 328, the lock device 102 confirms to the guest device 108 that the real-time clock 110 has been updated and, in sub-flow 330, the lock device 102 and the guest device 108 end the wireless communication session (e.g., the BLE session).

As indicated above, in some embodiments, the clock update token generated by the cloud server 106 may include a timestamp caveat that identifies an appropriate time basis for the real-time clock 110 of the lock device 102 (see block 510 of FIG. 5). Accordingly, in such embodiments, it should be appreciated that the lock device 102 may update the real-time clock 110 based on that timestamp caveat without receiving a separate command from the guest device 108 and/or the cloud server 106. As such, the blocks 322, 324, 328 of FIG. 4 may be omitted in embodiments in which clock update token includes such a timestamp caveat. It should be appreciated that, when the real-time clock 110 is updated based on a value that comes directly from the cloud server 106, the updated clock value is unaffected by the local time on the guest device 108 and, therefore, less susceptible to a malicious attack on that basis.

Although the sub-flows 302-330 are described in a relatively serial manner, it should be appreciated that various sub-flows of the method 300 may be performed in parallel in some embodiments.

It should be appreciated that because the hash generated and included within the clock update token (see block 506 of FIG. 5) is based on the session random value tied to the particular communication session (e.g., BLE session), the hash will not match across different communication sessions. Further, in the illustrative embodiment, the non-zero random value generated by the lock device 102 changes with each power cycle of the lock device 102 such that a different clock update token is generated subsequent to each lock reset. Further, the session random value provides additional randomness to the non-zero random value, which helps to prevent replay attacks. Additionally, in some embodiments, the lock device 102 is configured to force a communication session disconnection (e.g., a BLE disconnect) to occur when authentication fails. Because a new session random value is generated for each session, a malicious party may only be able to present a particular token once before the relevant value is obsolete.

As indicated above, after the real-time clock 110 has been updated the access control system 100 may function as described in the Flexible Distributed Tokens Application. As such, the lock device 102 may subsequently receive a request from the guest device 108 (e.g., the same guest device 108 or different guest device 108) to control the lock device 102. It should be appreciated that the request may include a caveated cryptographic bearer token with a time-based caveat that defines a time limit for control of the lock device 102.

What is claimed is:

1. An access control device, comprising:
   a processor; and
   a memory comprising a plurality of instructions stored thereon that, in response to execution by the processor, causes the access control device to:
     transmit a wireless communication message that identifies a clock status of a real-time clock of the access control device to a computing device, wherein the clock status includes a clock status value indicating that the real-time clock has not been set after a reset event;
     transmit a session random value to the computing device;
     receive a clock update token from the computing device, wherein the clock update token is indicative of an authority of the computing device to update the real-time clock of the access control device;
     authenticate the clock update token based on at least the session random value; and
     update the real-time clock based on a received update time in response to successful authentication of the clock update token.

2. The access control device of claim 1, wherein the clock status value is a current clock status value; and
   wherein the current clock status value is modified in response to each power cycle of access control device.

3. The access control device of claim 1, wherein the clock update token comprises a caveated cryptographic bearer token that includes a clock update caveat that limits access control permissions of the computing device over the access control device to update the real-time clock of the access control device.

4. The access control device of claim 3, wherein the clock update token further includes a timestamp caveat that identifies an appropriate time basis for the real-time clock of the access control device.

5. The access control device of claim 3, wherein the clock status value is a non-zero random value; and
   wherein the clock update token further includes one or more caveats corresponding with a cryptographic hash generated based on the non-zero random value and the session random value.

6. The access control device of claim 5, wherein to authenticate the clock update token comprises to:
   generate a reference cryptographic hash based on the non-zero random value and the session random value; and
   compare the reference cryptographic hash to the cryptographic hash corresponding with the one or more caveats of the clock update token.

7. The access control device of claim 6, wherein to authenticate the clock update token comprises to determine whether the real-time clock has been set after the reset event based on a clock status flag.

8. The access control device of claim 1, wherein the clock update token limits access control permissions of the computing device over the access control device to update the real-time clock of the access control device and to performing one or more additional functions with respect to accessing certain data of the access control device.

9. A method, comprising:
   transmitting, by an access control device and to a computing device, at least one wireless communication message that identifies a clock status of a real-time clock of the access control device and a session random value, wherein the clock status includes a clock status value indicating that the real-time clock is inaccurate;
   receiving, by the access control device, a clock update token from the computing device, wherein the clock update token is indicative of an authority of the computing device to update the real-time clock of the access control device;
   authenticating, by the access control device, the clock update token based on at least the session random value; and
   updating, by the access control device, the real-time clock based on a received update time in response to successful authentication of the clock update token.

10. The method of claim 9, wherein the clock status value is a current clock status value; and
    wherein the current clock status value is modified in response to each power cycle of access control device.

11. The method of claim 9, wherein the clock update token comprises a caveated cryptographic bearer token that includes a clock update caveat that limits access control permissions of the computing device over the access control device to update the real-time clock of the access control device.

12. The method of claim 11, wherein the clock update token further includes a timestamp caveat that identifies an appropriate time basis for the real-time clock of the access control device.

13. The method of claim 11, wherein the clock status value is a non-zero random value; and
    wherein the clock update token further includes one or more caveats corresponding with a cryptographic hash generated based on the non-zero random value and the session random value.

14. The method of claim 13, wherein authenticating the clock update token comprises:
    generating a reference cryptographic hash based on the non-zero random value and the session random value; and
    comparing the reference cryptographic hash to the cryptographic hash corresponding with the one or more caveats of the clock update token.

15. The method of claim 9, wherein the clock update token limits access control permissions of the computing device over the access control device to update the real-time clock of the access control device and to performing one or more additional functions with respect to accessing certain data of the access control device.

16. One or more non-transitory machine-readable storage media comprising a plurality of instructions stored thereon that, in response to execution by an access control device, causes the access control device to:
    transmit at least one wireless communication message that identifies a clock status of a real-time clock of the access control device and a session random value to a computing device, wherein the clock status includes a clock status value indicating that the real-time clock has not been set after a reset event;
    receive a clock update token from the computing device, wherein the clock update token is indicative of an authority of the computing device to update the real-time clock of the access control device;

authenticate the clock update token based on at least the session random value; and update the real-time clock based on a received update time in response to successful authentication of the clock update token.

17. The one or more non-transitory machine-readable storage media of claim 16, wherein the clock update token comprises a caveated cryptographic bearer token that includes a clock update caveat that limits access control permissions of the computing device over the access control device to update the real-time clock of the access control device.

18. The one or more non-transitory machine-readable storage media of claim 17, wherein the clock update token further includes a timestamp caveat that identifies an appropriate time basis for the real-time clock of the access control device.

19. The one or more non-transitory machine-readable storage media of claim 17, wherein the clock status value is a non-zero random value; and wherein the clock update token further includes one or more caveats corresponding with a cryptographic hash generated based on the non-zero random value and the session random value.

20. The one or more non-transitory machine-readable storage media of claim 19, wherein to authenticate the clock update token comprises to:

generate a reference cryptographic hash based on the non-zero random value and the session random value; and compare the reference cryptographic hash to the cryptographic hash corresponding with the one or more caveats of the clock update token.

* * * * *